(12) United States Patent
Glover et al.

(10) Patent No.: US 9,340,445 B2
(45) Date of Patent: May 17, 2016

(54) OPTICAL FIBERS PRODUCED IN MICROGRAVITY ENVIRONMENTS AND METHOD OF PRODUCTION

(71) Applicants: Richard L. Glover, Albuquerque, NM (US); William F. Seng, Edgewood, NM (US)

(72) Inventors: Richard L. Glover, Albuquerque, NM (US); William F. Seng, Edgewood, NM (US)

( * ) Notice: Subject to any disclaimer, the term of this patent is extended or adjusted under 35 U.S.C. 154(b) by 760 days.

(21) Appl. No.: 13/840,987

(22) Filed: Mar. 15, 2013

(65) Prior Publication Data

US 2015/0266767 A1  Sep. 24, 2015

(51) Int. Cl.
| | | |
|---|---|---|
| *G02B 6/02* | (2006.01) | |
| *G02B 6/00* | (2006.01) | |
| *C03B 37/023* | (2006.01) | |
| *C03B 37/014* | (2006.01) | |
| *F27B 1/26* | (2006.01) | |
| *F27B 1/28* | (2006.01) | |
| *C03B 37/025* | (2006.01) | |
| *C03B 37/012* | (2006.01) | |
| *C03B 37/03* | (2006.01) | |
| *C03B 37/029* | (2006.01) | |
| *C03C 13/04* | (2006.01) | |
| *C03C 25/10* | (2006.01) | |
| *C03B 37/027* | (2006.01) | |

(52) U.S. Cl.
CPC ......... *C03B 37/0253* (2013.01); *C03B 37/0126* (2013.01); *C03B 37/01211* (2013.01); *C03B 37/029* (2013.01); *C03B 37/032* (2013.01); *C03B 37/027* (2013.01); *C03B 2201/78* (2013.01); *C03B 2201/82* (2013.01); *C03B 2201/86* (2013.01); *C03B 2205/00* (2013.01); *C03B 2205/30* (2013.01); *C03B 2205/40* (2013.01); *C03C 13/042* (2013.01); *C03C 13/043* (2013.01); *C03C 25/106* (2013.01); *C03C 2218/32* (2013.01); *G02B 6/00* (2013.01); *G02B 6/02* (2013.01)

(58) Field of Classification Search
CPC ...... C03B 37/02; C03B 37/025; C03B 37/03; C03B 37/01211; C03B 37/012; C03B 37/01205; C03B 37/0126; C03B 37/0253; C03B 37/029; C03B 37/032; C03B 2205/12; C03B 2205/30
USPC ..................... 385/123, 141, 142; 65/385, 483
See application file for complete search history.

(56) References Cited

U.S. PATENT DOCUMENTS

| 4,040,890 | A | * | 8/1977 | Burrus, Jr. | ............. C30B 15/00 117/19 |
|---|---|---|---|---|---|
| 5,100,449 | A | * | 3/1992 | Cornelius | ............... C03B 15/02 65/182.1 |
| 5,667,585 | A | * | 9/1997 | Fukuda | ................... C30B 13/00 117/49 |
| 6,484,539 | B1 | * | 11/2002 | Nordine | ................. C03B 37/02 428/364 |

* cited by examiner

*Primary Examiner* — Robert Tavlykaev
(74) *Attorney, Agent, or Firm* — Alberto A. León; Aleon Law, P.C.

(57) ABSTRACT

Optical fibers with previously unattainable characteristics and the method of producing the same are disclosed and claimed herein. Specifically, the application discloses and claims a method to produce ZBLAN, Indium Fluoride, Germanate and Chalcogenide optical fibers and other similar optical fibers in a microgravity environment. The resulting optical fibers have unique molecular structures not attainable when optical fibers with the identical chemical composition are produced in a standard 1 gravity environment.

The method of the invention requires a novel draw tower and modified preform, which are specifically designed to operate in microgravity environments. A lead wire is inserted into the preform that, when wound onto a spool in the draw tower, causes a fiber to form. The pull rate of the lead wire controls the diameter of the fiber.

10 Claims, 8 Drawing Sheets

OPTICAL FIBERS PRODUCED IN MICROGRAVITY ENVIRONMENTS AND METHOD OF PRODUCTION

CROSS-REFERENCE TO RELATED APPLICATIONS

Provisional Patent Application No. 61/650,791 filed May 23, 2012.

STATEMENT REGARDING FEDERALLY SPONSORED RESEARCH AND DEVELOPMENT

Non-applicable

THE NAMES OF THE PARTIES TO A JOINT RESEARCH AGREEMENT

Non-applicable

INCORPORATION-BY-REFERENCE OF MATERIAL SUBMITTED ON A COMPACT DISC

Non-applicable

BACKGROUND OF THE INVENTION

1. Field of the Invention

The present invention generally relates to the technical field of materials science, more specifically, it relates to the field of optical fiber, still more particularly to optical fibers produced in a microgravity environment and a method of production.

2. Description of the Related Art Including Information Disclosed Under 37 CFR 1.97 and 37 CFR 1.98

The following description of the art related to the present invention refers to a number of publications and other references. Discussion of such references herein is given to provide a more complete background of the principles related to the present invention and is not to be construed as an admission that such references are necessarily prior art for patentability determination purposes.

This invention described and claimed in the present application comprises the innovative combination of at least two technological areas: (1) the creation and management of microgravity environments; and (2) the construction and operation of optical draw towers. Combining those two areas as disclosed and claimed in this application results in the production of an optical fiber that has unique molecular structure and physical characteristics not attainable using conventional production methods.

A. What are Microgravity Environments?

Gravity is widely used to describe the attractive force between two objects with mass. Gravity is one of nature's fundamental physical forces and it affects all physical, chemical and biological processes on Earth. On the surface of the Earth, gravity applies an attractive force that attempts to accelerate an object towards the center of the Earth at approximately 9.8 meters/seconds$^2$ (m/s$^2$). Scientists believe that gravity is present throughout the universe, and that the strength of the gravitational force is directly proportional to the mass of an object and the distance from the object. For example, to reach a point where Earth's gravitational pull is reduced to one-millionth of that at the Earth's surface, you would need to be approximately 6.37 million kilometers from the Earth (that's over 16 times farther than the moon).

Since gravity pervades all aspects of the processes that take place on Earth, humans are accustomed to its impact. Until relatively recently, we have assumed that the only way for all processes to occur was with the known influence of gravity. The advent of space travel changed that paradigm. Space travel gave rise to experimentation in environments with significantly less gravity than perceived on Earth. That experimentation lead to the discovery that many processes and compositions of matter behave differently in so-called "microgravity environments."

The term microgravity ($\mu g$) is generally defined as an environment where the local gravitational force is less than the standard gravity (g) experienced on the surface of the Earth (1 g). The exact force experienced in microgravity environments is a function of what method is used to create them. For example, a parabolic flight in an aircraft will result in a gravitational force that is about 1% of standard 1 g while a free flying satellite will experience about one millionth the force of standard 1 g. A potential impediment for understanding and furthering microgravity experimentation is that the ability to create and sustain a true reduced experimental gravity environment is much more complicated than merely reducing the effect of gravity.

As scientists have started to gain a better understanding of the impact of microgravity environments on processes, they have discovered that gravity's effect impedes a thorough understanding of many physical, chemical and biological phenomena. It is now widely known that gravity can mask some of the underlying, but critical, parameters that influence physical, chemical or biological processes. Gravity causes sedimentation, buoyancy and convection in liquids, creates hydrostatic pressure in liquids and modifies the behavior of liquid films on a surface. On the other hand, gravity tends to overwhelm capillary effects, multiphase flow, and diffusive transport processes.

As a result of the discoveries to date, it is generally understood that gravity is a factor in every process on Earth. In most processes, its impact is negligible. However in some processes, gravity is one of the key factors that leaves an imprint on the final structure of materials. Therefore the creation of reduced gravity environments for experiments has become a very important research area. While it is nearly impossible to create a gravity free environment, creating, monitoring and manipulating processes in a so-called microgravity environment has been achieved.

Microgravity experiments have revealed that even small forces present during a process can affect the process itself, i.e., the way the process takes place and the results. It is common to conduct experiments free of vibrational and other imparted forces. However, our present technological state does not allow full isolation from gravitational forces. It is well known that small forces acting on a process, whether vibrational or directional, can have similar effects on the process as gravity. For example, measurements on the International Space Station (ISS) showed large fluctuating accelerations, averaging approximately one thousandth of Earth's gravity, arose from movements of the crew, operation of equipment, spacecraft attitude adjustment, and waste dumps' operation. It was shown both theoretically and experimentally that those accelerations as well as other high-frequency vibrations can significantly impact the results of on-board experiments.

The similarity among the effects that different forces exert on processes, have brought about a pervasive misuse of terms. In many instances, reports of experimental results in a "microgravity environment," are actually results obtained in environments free of outside forces and accelerations. That misuse of terminology brings about an important distinction. Production in an environment free of external forces, not merely production in microgravity, results in unique organic and inorganic materials. To stay consistent with the generally accepted terminology, when the term "microgravity" is used in this application, it refers to environments in which gravity is reduced and all of the other forces mentioned above have been reduced or eliminated as well.

B. How can Microgravity Environments be Achieved?

There are a number of ways to achieve microgravity environments as defined above. Each manner of creation is distinct from the others in terms of duration and quality of the microgravity environment, as well as the effort, including cost, required to achieve each one. These different methods are briefly discussed below.

1. Drop Towers.

A drop tower comprises a vertical shaft capable of providing a short-lived microgravity environment during the free fall of an experimental package for a time period proportional to the height of the tower. Microgravity levels between $10^{-3}$ g and $10^{-5}$ g have been measured in drop towers by adopting different techniques to counter the effect of acceleration due to gravity. Most experiments conducted using drop towers result in 2-3 seconds of microgravity. The Microgravity Center in Kami-Sunagwa, Hokkaido, Japan, however, is built in an old mine shaft and offers up to 10 seconds at $10^{-5}$ g. In addition to the short duration of microgravity, a major disadvantage of drop towers is the impact the package undergoes at the bottom of the tower.

2. Parabolic Flights.

Aircraft can fly in a series of parabolic arcs to achieve longer periods of microgravity, typically 20 to 25 seconds. The resulting microgravity environment during these parabolic arcs is $10^{-2}$ g to $10^{-3}$ g. In order to achieve microgravity, the airplane must climb rapidly until its nose is at about a 45-degree angle to the horizon then its engines are cut back. The airplane slows and the plane remains in free fall over the top of the parabola, and then nose-dives to complete the parabola. One of the major disadvantages of microgravity environment created using aircraft is the short duration.

3. Balloon Drop.

Stratospheric balloons can reach altitudes of 39 to 41 km and are being used regularly for a variety of missions, including space science missions. Such high altitude missions have also been used for microgravity research. Effectively, stratospheric balloons can be the equivalent of a very high drop tower. Stratospheric balloons can achieve a microgravity environment of $10^{-2}$ g to $10^{-3}$ g for up to 50 seconds. Stratospheric balloons present two significant drawbacks when used to create microgravity environments: (a) like the drop tower, the package must impact at the bottom of the drop, which can be mitigated to an extent by parachute; and (2) the overall microgravity environment is very poor due to random and irregular atmospheric buffeting and vibration.

4. Suborbital Rockets.

Suborbital rockets also fly parabolic paths but fly much higher than an airplane (up to 1500 km, depending on the rocket). This can result in up to 20 minutes of very high quality microgravity, $10^{-3}$ g to $10^{-4}$ g. The primary disadvantage of using suborbital rockets to conduct experiments in microgravity environments is the packaging requirements for the experiments. Such a package must fit within the volume constraints of the rocket and survive the high g launch load (up to 16 g) as well as the landing (up to 10 g shock).

5. Free Flying, Recoverable Satellites.

Free flying satellites (as contrasted with the International Space Station or the now retired space shuttles) provide an excellent microgravity environment for producing and processing materials. A free flying satellite in a 500 Km orbit can provide an environment of $10^{-5}$ g to $10^{-6}$ g for many months. The main drawbacks of using free flying satellites to conduct experiments or processes in microgravity environments are the requirements of safe reentry into the Earth's atmosphere and safe landing for recovery of the experimental package. That process is well understood and practiced routinely, however, it is more complex than a sounding rocket recovery system for example.

C. Summary of Available Microgravity Environments

| Method of Creation | Duration | Microgravity |
| --- | --- | --- |
| Drop tower | 2-10 seconds | $10^{-2}$ g to $10^{-5}$ g |
| Parabolic aircraft | 25 seconds | $10^{-2}$ g to $10^{-3}$ g |
| Balloon drop | 30-50 seconds | $10^{-2}$ g to $10^{-3}$ g |
| Suborbital rocket | 4-20 minutes | $10^{-3}$ g to $10^{-4}$ g |
| Free flying satellite | months | $10^{-5}$ g to $10^{-6}$ g |

D. Optical Draw Towers for Fiber Production

Optical fiber production is a useful process that can be greatly affected when conducted in a microgravity environment. The optical fiber production process begins with what is called a "preform" which is placed at the top of a drop tower. The preform usually comprises several layers of glass with different refractive indices which provide the core and cladding of the fiber. The preform can take on a variety of shapes, although the most common is circular. The size, shape and taper geometry of preforms are a function of the material to be used for the fiber as well as the specific requirements of the draw tower pulling system.

The method of producing optical fibers using a preform comprises the steps of: (1) placing the preform at the top of a draw tower (which is typically greater than 20 feet in height); (2) lowering the preform into a draw furnace; (3) using the draw furnace to heat the preform until a piece of molten glass, called a gob, begins to fall from the lower end of the preform due to the pull of gravity, much like hot taffy; (4) allowing the gob to pull a thin strand of glass as it falls, resulting in the first stage of the optical fiber; (5) cutting off the gob; (6) threading the resulting fine fiber strand into a computer controlled tractor assembly where it continues to be drawn; (7) using a laser system to monitor the fiber diameter; (8) using the laser system being to provide feedback to the computer controlled tractor assembly; (9) controlling the speed of the assembly so as to precisely control the diameter of the resulting fiber; (10) using a system of spray-on acrylic/polymer to coat the fiber, with the exact number and type of coatings applied being variable and depending on the specific application of the fiber; (11) illuminating the fiber using a UV lamp until the coating is hardened; and (12) winding the fiber on spools located at the bottom of the draw tower for shipment or further processing as necessary Although the specific layout and operation will vary slightly from producer to producer, FIG. 1 illustrates the general process as well the typical components used in fiber optic production.

E. Fiber Production in Microgravity

It is well-known and well-understood that gravity affects the structure of a material lattice in two distinct ways: (1) directly through deformation that it imposes on the lattice during formation; and (2) indirectly through convection which induces mixing of the material as a function of the mass of each element. NASA, ESA and other space agencies have sponsored numerous experiments that have shown that production of materials in microgravity suppresses the creation of inclusions, dislocations, and crystallization centers.

During the late 1990's NASA and Canadian Space Agency researchers conducted experiments on KC-135 aircraft and suborbital rockets to try to determine whether ZBLAN optical fiber would crystallize while being drawn in a microgravity environment. They were able to demonstrate that when a small length of ZBLAN optical fiber, less than 1 meter in length, was drawn in microgravity it did not have crystallization. Budget issues and other priorities prevented the researchers from determining whether their results were anomalous or indicative of a new capability. That is a critical data point because manufacturers that produce ZBLAN optical fiber in a standard 1-gravity environment often end up with short segments (on the order of 1 meter) that are relatively crystal free while the overall optical fiber is heavily crystallized. Therefore, the fact that researchers were able to produce a short length of crystal free optical fiber in microgravity does not demonstrate that all fiber produced in microgravity would be free of crystallization.

Further, researchers have never been able to agree on the mechanism which would explain why ZBLAN produced in microgravity might be free of crystallization while ZBLAN produced in standard 1-gravity with the same process is heavily crystallized. Some NASA researchers believe that shear thinning in undercooled liquids increases the rate of nucleation and crystallization of glass forming melts. They believe that the shear of the melt can be reduced in low-g enhancing undercooling and glass formation.

Canadian researchers from the Department of Mechanical and Materials Engineering, Queen's University, Kingston, Ontario believe that the role of viscosity is critical in the devitrification mechanism of ZBLAN glass and in determining the optimum fiber-drawing temperature. Dennis S. Tucker, Space Optics Manufacturing Technology Center and Gary L. Workman and Guy A. Smith, Center for Automation and Robotics, University of Alabama in Huntsville carried out the experiment which pulled the small section of ZBLAN optical fiber during the microgravity portion of a KC-135 flight and they said, "It appears qualitatively, that gravity does have an effect on ZBLAN crystallization during fiber pulling. The exact mechanism is unknown at this time." Although the initial research conducted during the late 1990's was useful, it was far from teaching or suggesting sufficient information to enable a person of ordinary skill in the art to conceive, let alone reduce to practice, the invention described and claimed herein without substantial, material, additional detailed research and experimentation.

BRIEF SUMMARY OF THE INVENTION

The present application discloses and claims a new method for the manufacture of fluorozirconate and other similar optical fibers in a microgravity environment (free of external forces). The production of optical fibers in microgravity environment allows atoms in the material to arrange into their preferred, lowest energy state, free of irregularities and crystallization centers. Irregularities and crystallization centers result from external forces (primarily gravity) acting on the material as it solidifies, and prevent the material from settling to its preferred, lowest energy state.

The optical fibers of the present invention represent new compositions of matter with material characteristics unique to this production method. The miniature draw towers used for various methods of attaining microgravity are depicted in the drawings.

BRIEF DESCRIPTION OF THE SEVERAL VIEW OF THE DRAWINGS

The accompanying drawings, which are incorporated into and form a part of the specification, illustrate an embodiment of the present invention and, together with the description, serve to explain the principles of the invention. The drawings are only for the purpose of illustrating various embodiments of the invention and are not to be construed as limiting the invention.

DETAILED DESCRIPTION OF THE INVENTION

Objects, advantages and novel features, and further scope of applicability of the present invention are set forth in the detailed description below, taken in conjunction with the accompanying drawings. The objects, advantages and novel features, and further scope of applicability of the present invention will become apparent to those skilled in the art upon examination of the following, or may be learned by practice of the invention. The objects and advantages of the invention may be realized and attained by means of the instrumentalities and combinations particularly pointed out in the appended claims.

The present application discloses and claims novel fluorozirconate and other optical fibers, which are new to the extent that their characteristics, properties, specifications and functionality are different from the same fibers produced by standard methods.

The present application also discloses and claims a method to produce fluorozirconate and other similar optical fibers in a microgravity environment (free of external forces), as well as the miniature optical fiber draw towers used to produce them in microgravity environments. The method of the present invention results in new optical fibers to the extent that they have significantly reduced scattering centers and absorption losses near theoretical values when compared to fibers produced in a standard 1-gravity environment.

The impact of eliminating the scattering centers within the drawn fiber are illustrated by comparing the optical properties of zirconium fluoride-barium fluoride-lanthanum fluoride-aluminum fluoride-sodium fluoride ($ZrF^4$—$BaF^2$—$LaF^3$—

AlF$^3$—NaF), otherwise known as "ZBLAN" fiber drawn in a 1-gravity environment with the optical properties of ZBLAN fiber drawn in a microgravity environment and having a modified internal structure. Table 1, below, illustrates the differences with a side-by-side comparison.

TABLE 1

Optical Properties

|  | ZBLAN | MEM-F1 |
| --- | --- | --- |
| Operating Wavelengths | 1.4-4.0 µm | 1.4-4.0 µm |
| Typical loss (1.4 µm to 2.7 µM) | 20 dB/Km | 0.05 dB/Km |
| Typical loss (2.7 µm to 4.0 µm) | 20 dB/Km | 1.0 dB/Km |
| Minimum loss | 5 dB/Km @ 2.7 µm | 0.02 dB/Km @ 2.7 µm |
| Maximum loss | 100 dB/Km @ 4.0 µm | 50 dB/Km @ 4.0 µm |

The operating wavelengths for both fibers are identical because they are determined by the chemical composition of the fiber, not by the existence of scattering centers distributed throughout the internal structure.

Figure 2:
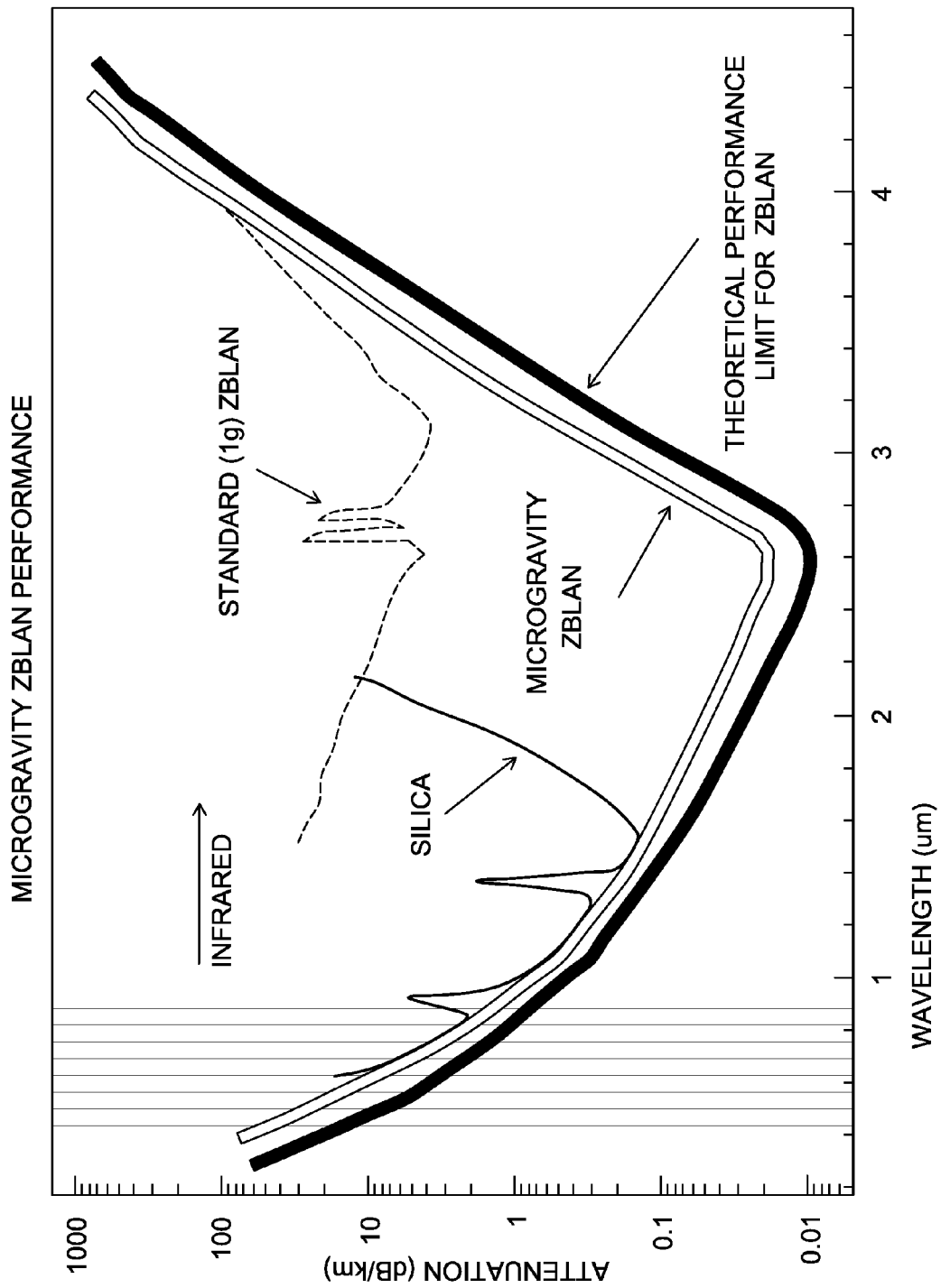
FIG. 2 is a graph which illustrates predicted performance of embodiments of ZBLAN produced using the method of this invention.

FIG. 2 shows predicted performance of embodiments of ZBLAN produced using the method of this invention. As FIG. 2 illustrates, the difference in optical attenuation between both fibers is dramatically different. The larger and wavelength dependent attenuation in ZBLAN that has been drawn in a 1-gravity environment can be explained by the fact that their internal crystallization centers vary in size and distribution and as a result scatter the propagating wavelengths differently. On the other hand, the other fiber, MEM-F1, has been drawn in microgravity and has an internal structure free of scattering centers. The result is optical performance that matches the theoretical optical performance predicted for the chemistry of the fiber.

This composition of ZBLAN, which we call MEM-F1 cannot be produced in the standard 1-gravity environment of Earth because gravity imparts additional energy to the fiber during the drawing process, which prevents the chemical structure from settling into its lowest energy and preferred state.

The method of production disclosed and claimed herein creates ZBLAN, Indium Fluoride, Germanate and Chalcogenide optical fibers with characteristics which cannot be attained by production in the standard 1-gravity environment of Earth. The resulting optical fibers are comprised of atoms arranged into their preferred, lowest energy state, free of irregularities and crystallization centers have the following characteristics:

a. ZBLAN
 i. operating wavelengths—0.3 µm to 4.3 µm,
 ii. typical loss (1.4 µm to 2.7 µm)—0.01 dB/Km to 10 dB/Km,
 iii. typical loss (2.7 µm to 4.3 µm)—0.5 dB/Km to 10 dB/Km,
 iv. minimum loss—0.01 dB/Km to 1 dB/Km@2.7 and
 v. maximum loss—300 dB/Km to 600 dB/Km@4.3 µm;
b. Indium Fluoride
 i. operating wavelengths—0.3 µm to 5.5 µm,
 ii. typical loss (2.0 µm to 4.0 µm)—0.01 dB/Km to 10 dB/Km,
 iii. typical loss (4.0 µm to 5.0 µm)—0.5 dB/Km to 10 dB/Km,
 iv. minimum loss—0.01 dB/Km to 1 dB/Km@3.5 µm, and
 v. maximum loss—100 dB/Km to 1000 dB/Km@5.5 µm;
c. Germanate
 i. operating wavelengths—1.0 µm to 3.2 µm,
 ii. typical loss (1.0 µm to 2.0 µm)—0.01 dB/Km to 100 dB/Km,
 iii. typical loss (2.0 µm to 3.0 µm)—1.0 dB/Km to 100 dB/Km,
 iv. minimum loss—0.01 dB/Km to 10 dB/Km@2.4 and
 v. maximum loss—100 dB/Km to 1000 dB/Km@3.2 µm;
d. Chalcogenide
 i. operating wavelengths—2.0 µm to 6.0 µm,
 ii. typical loss (2.0 µm to 4.0 µm)—0.1 dB/Km to 50 dB/Km,
 iii. typical loss (4.0 µm to 6.0 µm)—0.1 dB/Km to 50 dB/Km,
 iv. minimum loss—0.1 dB/Km to 10 dB/Km@2.7 µm, and
 v. maximum loss—100 dB/Km to 200 dB/Km@4.2 µm.

In the preferred embodiment, the resulting optical fibers will have the following characteristics:

a. ZBLAN
 i. operating wavelengths—0.3 µm to 4.3 µm,
 ii. typical loss (1.4 µm to 2.7 µm)—Less than 0.5 dB/Km,
 iii. typical loss (2.7 µm to 4.3 µm)—Less than 1.0 dB/Km,
 iv. minimum loss—0.1 dB/Km@2.7 µm, and
 v. maximum loss—300 dB/Km@4.3 µm;
b. Indium Fluoride
 i. operating wavelengths—0.3 µm to 5.5 µm,
 ii. typical loss (2.0 µm to 4.0 µm)—Less than 0.5 dB/Km,
 iii. typical loss (4.0 µm to 5.0 µm)—Less than 1.0 dB/Km,
 iv. minimum loss—0.1 dB/Km@3.5 and
 v. maximum loss—100 dB/Km@5.5 µm;
c. Germanate
 i. operating wavelengths—1.0 µm to 3.2 µm,
 ii. typical loss (1.0 µm to 2.0 µm)—Less than 0.5 dB/Km,
 iii. typical loss (2.0 µm to 3.0 µm)—Less than 5.0 dB/Km,
 iv. minimum loss—0.1 dB/Km@2.4 µm, and
 v. maximum loss—100 dB/Km@3.2 µm;
d. Chalcogenide
 i. operating wavelengths—2.0 µm to 6.0 µm,
 ii. typical loss (2.0 µm to 4.0 µm)—Less than 0.5 dB/Km,
 iii. typical loss (4.0 µm to 6.0 µm)—Less than 1.0 dB/Km,
 iv. minimum loss—0.1 dB/Km@2.7 µm; and
 v. maximum loss—100 dB/Km@4.2 µm.

FIG. 2 illustrates the performance of one embodiment of the technique disclosed and claimed herein, the resultant ZBLAN optical fiber, after production in a microgravity environment. Although the basic mechanics and process for making this fiber in microgravity are similar to traditional methods, the results are unique.

Figure 3:
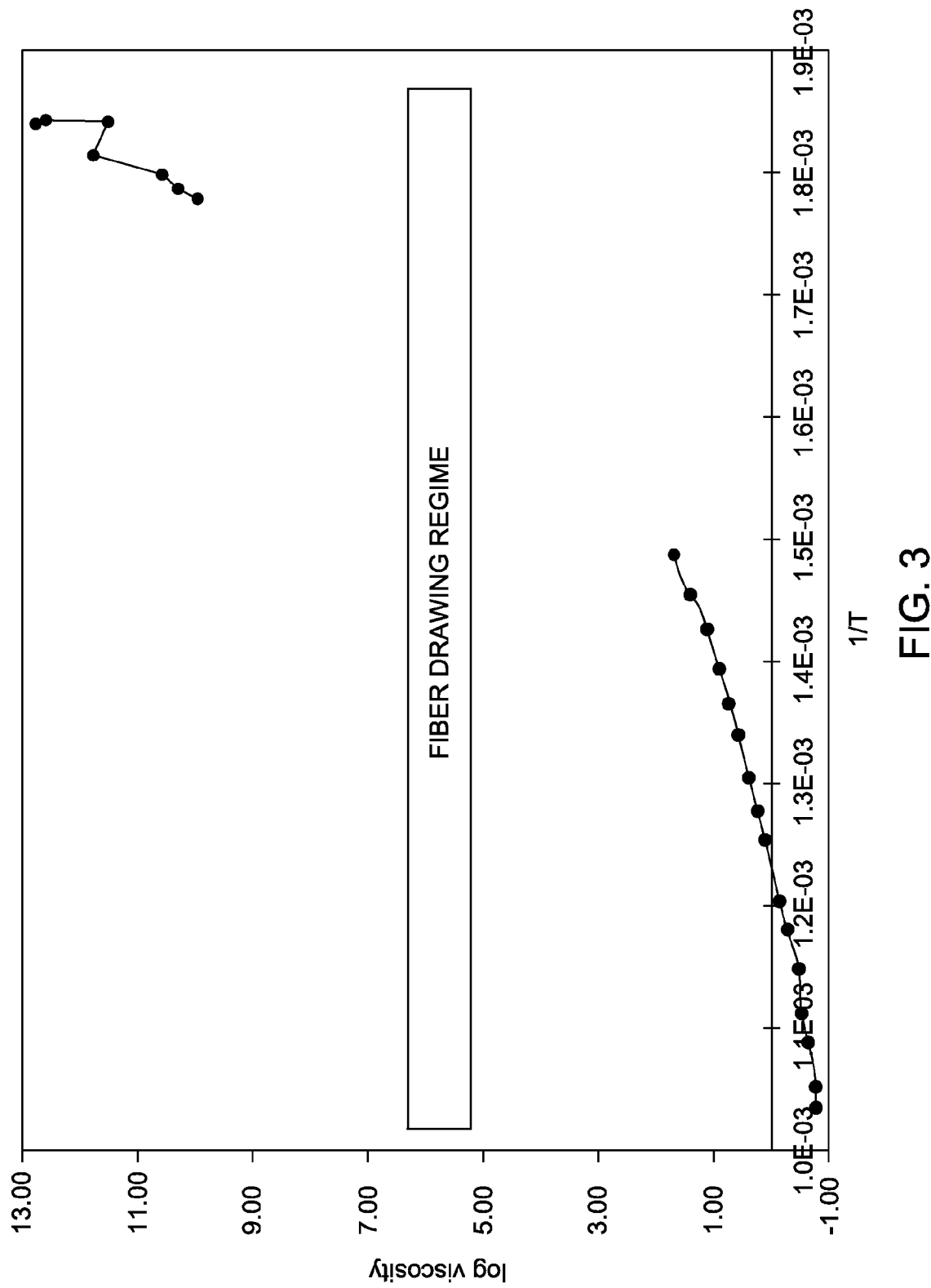
FIG. 3 is a graph illustrating temperature versus viscosity for an embodiment of the present invention on a KC-135 parabolic flight, indicating a desirable regime under which to draw fiber.

FIG. 3 is a graph illustrating temperature versus viscosity for an embodiment of the present invention on a KC-135 flight executing a low gravity, parabolic flight profile. This data shows the desirable regime under which to draw fiber.

Figure 4:
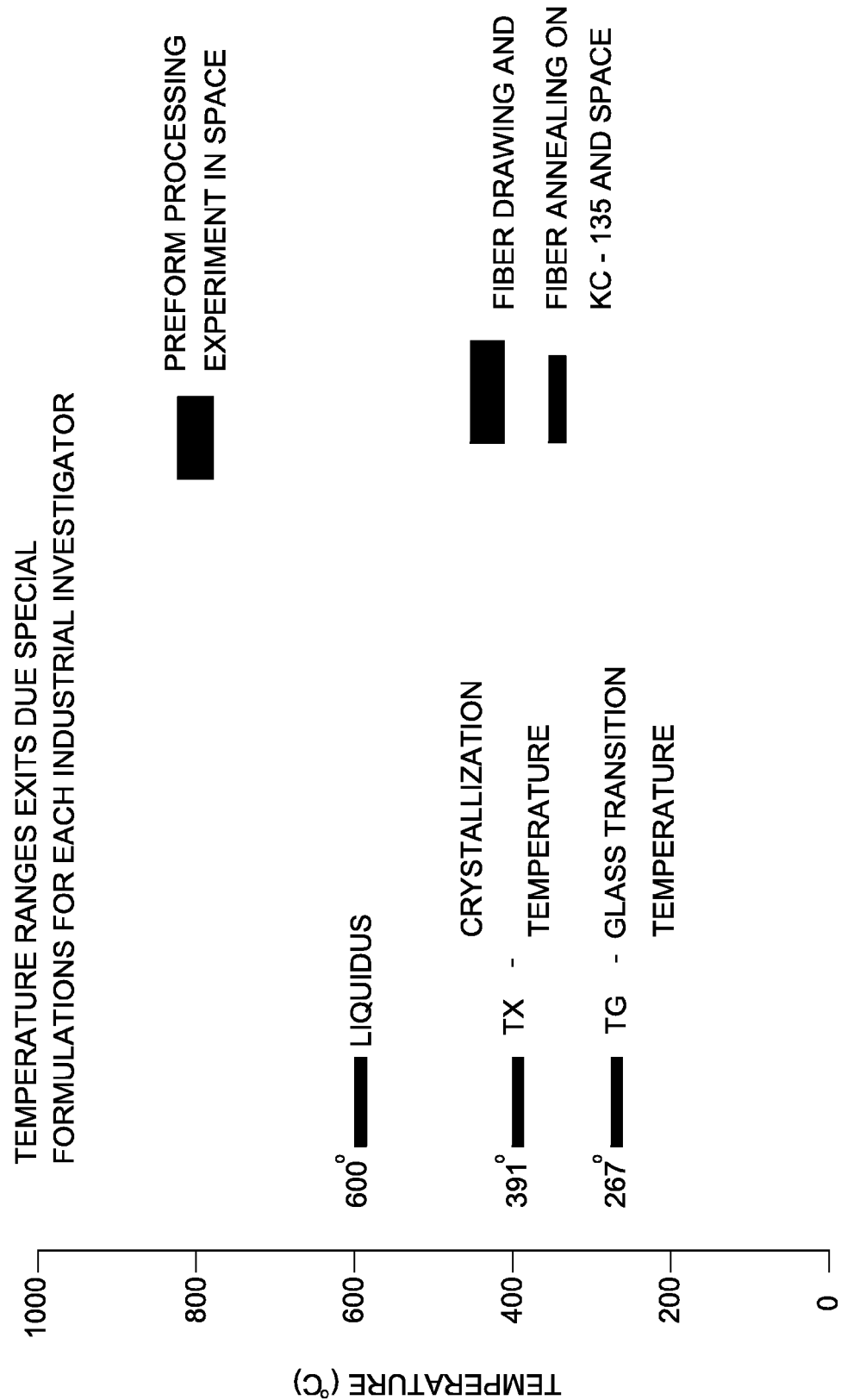
FIG. 4 is a graph which illustrates crystallization and glass transition temperatures for this KC-135 parabolic flight experiment that agree well with historical fabrication data.

FIG. 4 illustrates crystallization and glass transition temperatures for this low gravity environment on a KC-135 flight executing a low gravity, parabolic flight profile that agree well with historical fabrication data.

Figure 1:
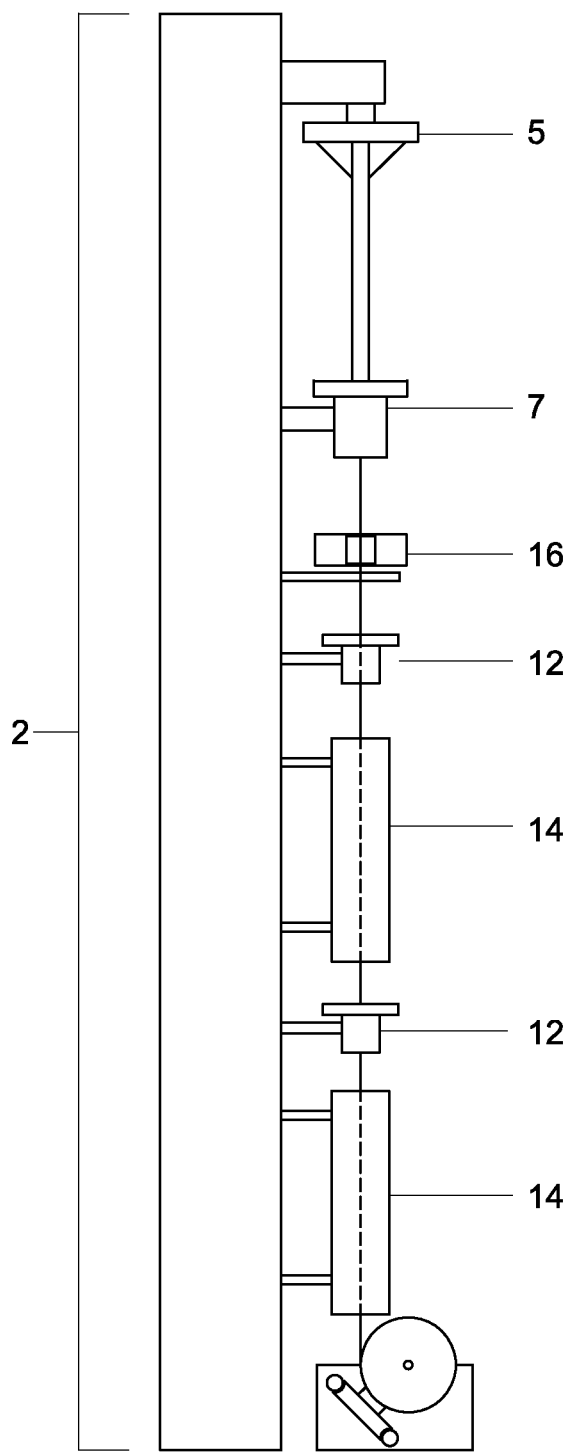
FIG. 1 is a schematic of a traditional fiber drawing apparatus. The overall process of drawing optical fibers from glass using a draw tower is well known in the art and is essentially the same no matter the chemical composition or optical properties of the glass.

The method of production disclosed and claimed herein requires the operation of a miniature optical fiber draw tower (MOFDT) in any one of the microgravity environments described above. The MOFDT is designed for use in microgravity environments and incorporates several unique features that allow it to operate differently than the prior art optical fiber draw towers described previously and depicted in FIG. 1.

Although a MOFDT contains the same basic components, the process of the present invention is unique because, among other characteristics: (1) it does not require the pull of gravity to start the fiber draw process; (2) it operates autonomously without the need for a human operator; (3) the tower optimizes its fiber production in response to microgravity conditions; (4) the draw tower starts and stops in response to microgravity conditions; (5) the pull rate (meters per second) varies in response to microgravity conditions; (6) the furnace temperature is variable in response to microgravity conditions and material being produced; (7) the optical draw tower is less than 6 feet tall; (8) the entire draw tower operates within a container; (9) the container can be purged with either a vacuum or inert gas; and (10) the container provides vibrational damping for the draw tower system.

The system container (1) disclosed and claimed herein serves three functions. First it enables the MOFDT to operate in any microgravity environment by isolating internal operations from external elements and processes. Second, the container provides vibrational dampening to further isolate the MOFDT from external forces. Lastly, the container minimizes water concentrations in the operating environment. Because some fiber materials, ZBLAN for example, are hydrophobic, it is important to minimize the water concentration within the operating environment. Purging the container with an inert gas, such as a high purity Argon gas, significantly lowers the water concentration and allows hydrophobic materials to be produced. Once the fiber has gone through one or more of the coating processes, it is no longer susceptible to water contamination and can be safely removed from the container.

Figure 8:
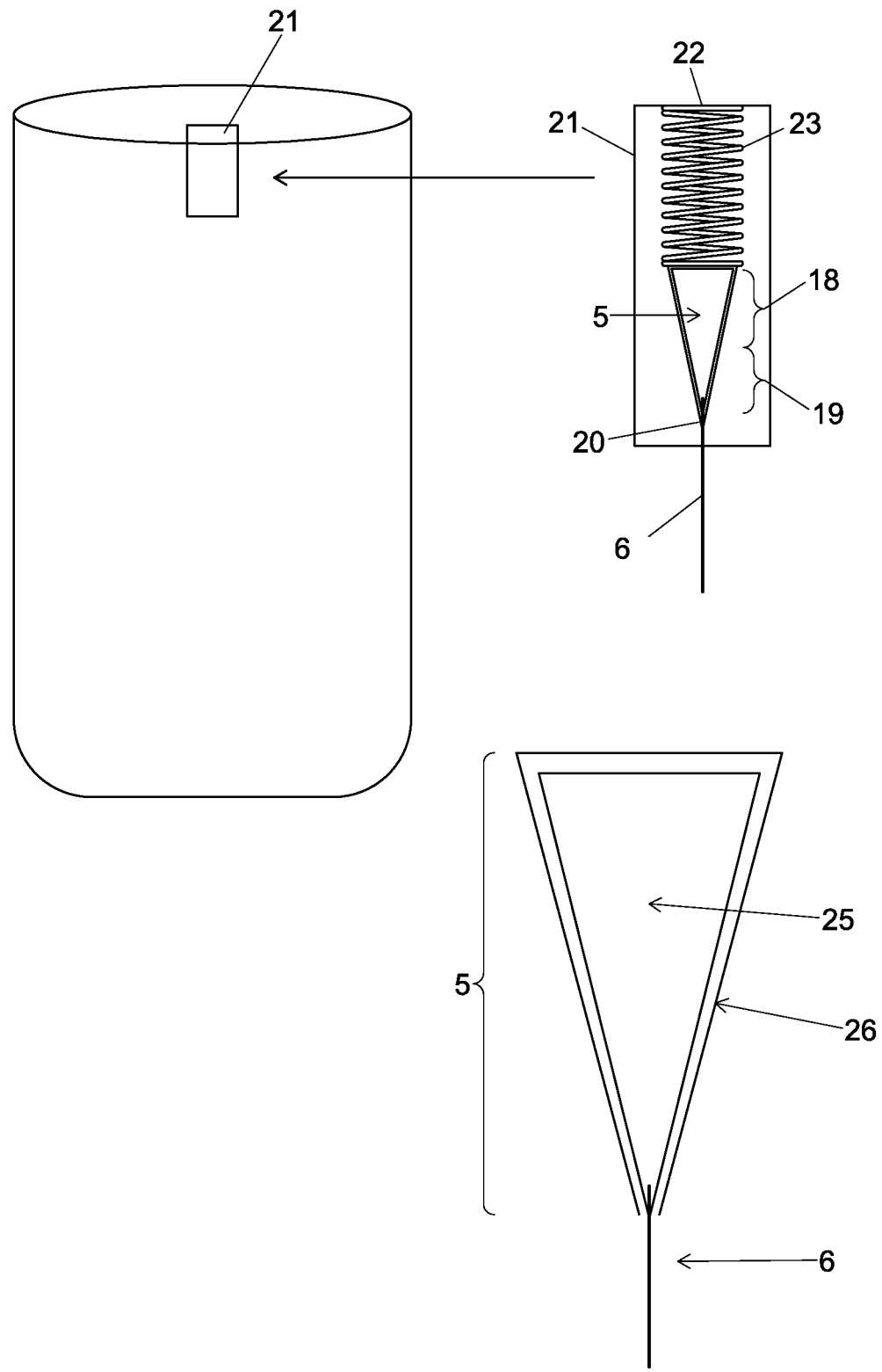
FIG. 8 illustrates the preform and preform holder of this invention.

The invention requires a specialized preform (5), which is depicted in FIG. 8. The preform comprises an upper end (18), a lower end (19) and core material (25) capable of being drawn into a fiber. The preform also comprises an external coating (26) made of a chemical composition with a lower refractive index when compared with the core to provide the cladding of the fiber. The core material (25) is ZBLAN, $InF_3$, $GeO_2$, or Chalcogenide. The preform (5) is capable of being held by a preform holder (21), which is also depicted in FIG. 8. The preform holder holds the preform and a spring-loaded pusher (23). The lower end of the preform comprises a tip (20), which is heated during the process and becomes viscous and taffy-like. The lower end (19) of the preform is threaded with a thin lead wire (6). The preform (5) is placed lower end (19) first into the preform holder (21). The spring-loaded pusher (23) is placed on top of the preform (5), abutting the upper end of the preform. The top or lid (22) of the preform holder is then closed. The spring in the spring-loaded pusher (23) is compressed by the top (22) of the preform holder, which results in it applying downward pressure on the upper end (18) of the preform.

The MOFDT assembly is housed in a body (2). The body fits into the container (1), which can be purged by a vacuum or inert gas. At the top of the container (1) is a spring-loaded pusher (23), which extends downward from the container's top and, when the MOFDT is loaded with a preform and the top (22) of the preform holder is closed, exerts pressure on the upper end (18) of the preform. This results in steady downward pressure on the preform (5) towards the bottom of the MOFDT body (2).

In the preferred embodiment of the invention, the preform holder (21), preform (5), spring-loaded pusher (23) and possibly the furnace (7) are housed in a environmental dry box (8) to minimize moisture coming into contact with the preform (5).

The MOFDT comprises a furnace (7), temperature monitoring systems, laser-based diameter gauge (16), coating systems and curing systems (14) for the fiber, similar to the prior art. The diameter gauge, or laser micrometer, is capable of sampling the diameter of the fiber at least 500 times per second. The coating systems typically comprise enclosures (12) through which the fiber passes and syringe pumps (13) that fill the enclosure with a spray of the appropriate acrylic/polymer coating. The curing systems (14) typically comprise one or more ultraviolet coils, lamps or ovens.

At the bottom of the MOFDT body is a spool assembly (11). The take up spool (10) is mechanized, and the speed at which the spool turns determines the diameter of the fiber. The lead wire (6) attached to the preform (5) is strung from the preform, through the furnace (7), laser micrometer (16), coating system enclosure(s) (12), curing systems (14) and a tensioner/guide (15) and then onto the spool (10). When the spool motor is activated, the spool starts turning, winding up the lead wire and drawing a fiber from the taffy-like preform. The fiber is then drawn through the various systems of the MOFDT and finally wound onto the spool (10) as a finished fiber.

The MOFDT also comprises a control system (9) that starts and stops the process, monitors the diameter of the fiber based on micrometer data, increases or decreases spooling speed as required based on the fiber's diameter, and controls the coating and curing systems. The control system (9) is capable of being controlled by radio or other remote signals. In some embodiments, the control system can also be started and stopped by signaling from a timer or microgravity sensor.

Figure 5:
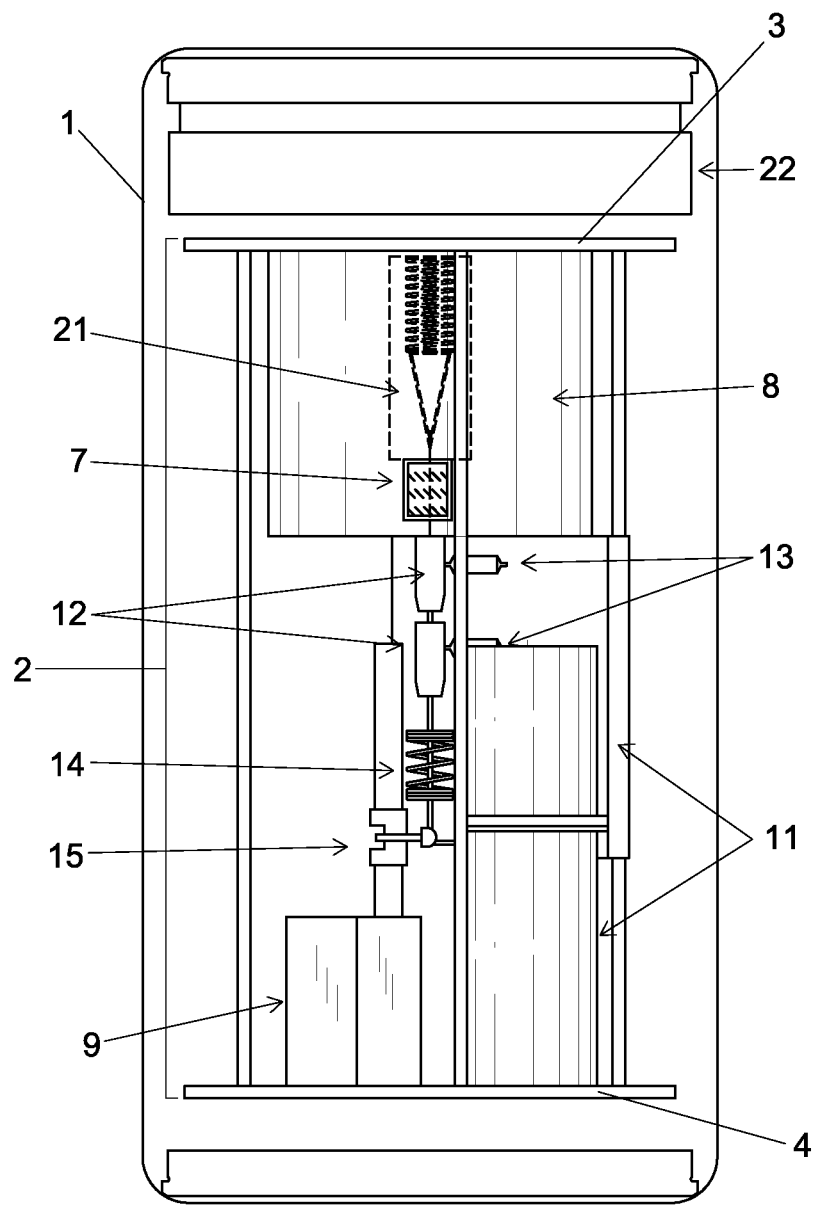
FIG. 5 illustrates the preferred configuration for the ZBLAN Miniature Draw Tower for use on the UP Aerospace SpaceLoft XL suborbital rocket.
Figure 6:
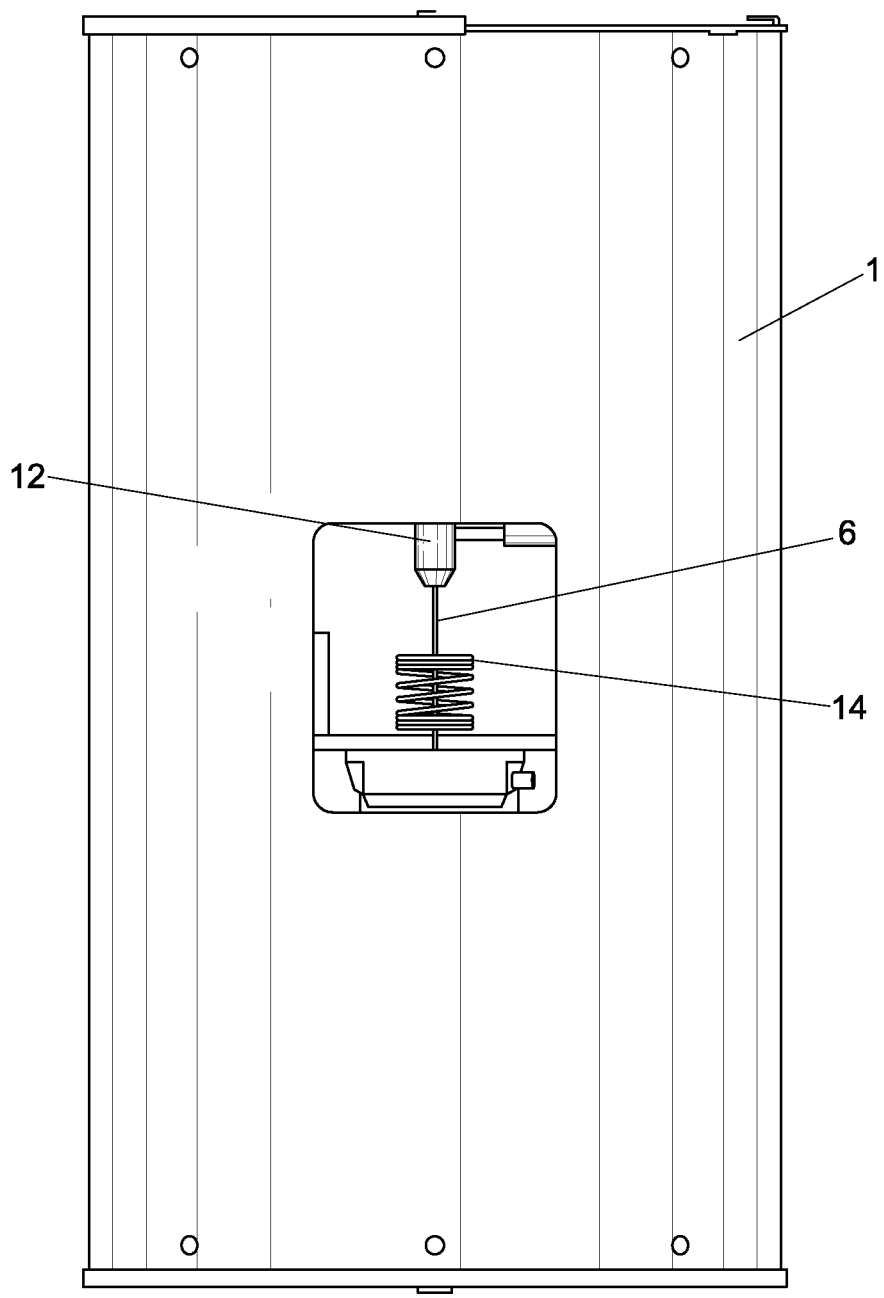
FIG. 6 illustrates the external view of the ZBLAN Miniature Draw Tower for the UP Aerospace rocket in a sealed container.
Figure 7:
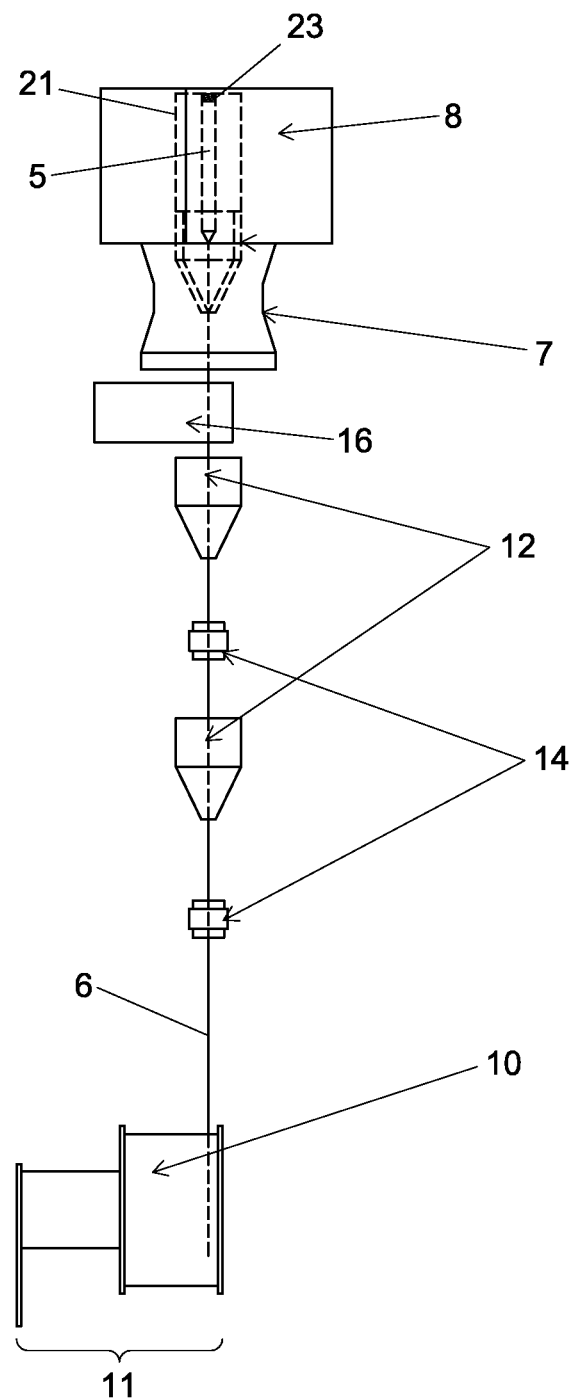
FIG. 7 illustrates a configuration of the ZBLAN Miniature Draw Tower for use on the Black Brant V suborbital rocket.

FIGS. 5, 6 and 7 show two different MOFDT embodiments for two different methods of achieving microgravity. Example 1 is the preferred embodiment for the invention. FIG. 5 illustrates an embodiment of the ZBLAN MOFDT designed to fit on the UP Aerospace suborbital rocket. This design is 20 inches in height, 9 inches in diameter and integrates a despin mechanism (24) to ensure that the MOFDT does not experience any forces due to the spin of the rocket and three axis accelerometers, which are capable of measuring all of the forces acting on the MOFDT. FIG. 6 illustrates the ZBLAN MOFDT in the sealed container (1) with a cut out to show the MOFDT orientation within the container.

Example 2 is another embodiment of the ZBLAN MOFDT designed to fit on the Black Brant V suborbital rocket. FIG. 7 illustrates this embodiment with the primary difference from Example 1 being the orientation of the spool motor assembly (11). This embodiment would allow for up to six MOFDTs to be integrated within a single container (1) on the Black Brant V rocket.

Other embodiments of the MOFDT can be placed in any of the previously discussed microgravity environments such as aircraft or drop towers (including the use of a high altitude balloon as a drop tower). Although these embodiments are equally executable, they suffer the primary disadvantage of limited time in the microgravity environment.

A critical step in using the MOFDT is the step of initiating the fiber draw from the preform. As described above, a standard system uses gravity to form a fiber by allowing the softened glass gob to slowly fall from the end of the preform tip. The present invention comprises the steps of: (1) modifying a preform before placing it in the draw tower by pre-inserting a lead wire, which is a thin wire in the preform's tip; (2) threading the lead wire through the draw tower assembly, which obviates any further need for a human operator; (3) wrapping the wire onto a spool placed at the bottom of the draw tower; (4) allowing the spool to pull the wire and resulting fiber through the assembly when the preform tip reaches the right temperature for the specific material being used; and (5) the system container optimizes production based on input from 3 axis accelerometers capable of measuring all of the forces acting on the MOFDT. These forces provide input to the control system architecture, which makes the decision to start or stop a pull, adjust the pull rate or modify the furnace temperature.

The method of producing optical fibers in a microgravity environment comprises the steps of: preparing a preform, as described above, and modifying the preform by inserting a lead wire into the lower end of the preform. The preform is placed into a preform holder, which is located above the MOFDT assembly, with the preform's lower end and the lead wire inserted first. When the top of the preform holder is closed, it will engage the spring-loaded pusher at the top of the container, resulting in the preform having a steady pressure forcing it inwards towards the body of the MOFDT. The lead wire is threaded through the MOFDT assembly and wrapped around the spool at the bottom of the MOFDT. The MOFDT container is closed and sealed and placed in a microgravity environment.

In order to operate the MOFDT, the MOFDT control system must receive a signal, either by radio or from a timer, microgravity sensor or other automated device. Once the control system receives the signal to start operation, it activates the furnace which forms a funnel around the lower end of the preform and monitors the temperature of the furnace. When the control system determines that the tip of the lower end of the preform has become sufficiently viscous or "taffy like," it signals the take up spool to begin rotating, which begins winding the lead wire around the spool and also begins pulling the material from the preform into a thin fiber. The control system monitors the diameter of the pulled optical fiber using data from the laser-based diameter gauge, which samples the diameter of the fiber at a rate greater than 500 times per second. Based on the data, the control system controls the diameter of the optical fiber by speeding up the spool rotation when the optical fiber diameter is too large and slowing the spool rotation when the optical fiber diameter is too small. The control system then activates the coating system to spray on acrylic/polymer to coat the fiber with the exact number and type of coatings desired, the number and type being variable and depending on the specific application of the fiber. The control system then illuminates the fiber with ultraviolet light as it is pulled past the curing system until the coatings are hardened. The finished fiber winds onto the take up spool. The processing continues until the control system receives a command to stop operation.

What is claimed is:

1. A method of producing optical fibers in a micro gravity environment comprising the steps of:
   a. preparing a preform, the preform comprising an upper end and a lower end, the lower end comprising a tip, the preform further comprising a core material configured to be drawn into a fiber, the core material comprising ZBLAN, $InF_3$, $GeO_2$, or Chalcogenide, the preform further comprising an external coating made of a chemical composition with a lower refractive index compared with the core material to provide a cladding of the fiber;
   b. modifying the preform by inserting a thin lead wire into the lower end of the preform;
   c. placing the preform and a spring loaded pusher into a preform holder located in a miniature optical fiber draw tower (MOFDT) assembly, the MOFDT assembly comprising a body, the MOFDT body comprising a top and a bottom, the MOFDT assembly further comprising control systems, coating systems, a curing system, and a take up spool located at the bottom of the MOFDT body, so that the preform's lower end and the lead wire are inserted first followed by the preform's upper end;
   d. closing the preform holder so that the spring loaded pusher ends up in firm contact with the upper end of the preform resulting in the preform having a steady pressure forcing it inwards towards the bottom of the MOFDT body;
   e. threading the lead wire through a tensioner/guide of the MOFDT assembly;
   f. wrapping the lead wire around the take up spool located at the bottom of the MOFDT body;
   g. closing and sealing a MOFDT container;
   h. placing the MOFDT container in a microgravity environment;
   i. using a radio signal to send a command to the MODFT control systems to start operation;
   j. heating a furnace which forms a funnel around the lower end of the preform;
   k. monitoring a temperature of the furnace with the MOFDT control systems;
   l. signaling the take up spool to begin rotating once the control systems determine that the tip of the lower end of the preform has become viscous or "taffy like";
   m. rotating the take up spool to continue winding the lead wire around the spool and also begins pulling the material from the preform into a thin fiber;
   n. monitoring a diameter of the pulled optical fiber by a laser-based diameter gauge;
   o. sampling the diameter of the fiber at a rate greater than 500 times per second;
   p. controlling the diameter of the optical fiber by speeding up the take up spool rotation when the optical fiber diameter increases and slowing the take up spool rotation when the optical fiber diameter decreases;
   q. using the coating system to spray on an acrylic/polymer to coat the fiber with an exact number and type of coatings desired, the number and type being variable and depending on a specific application of the fiber;
   r. illuminating the fiber as it is pulled past the curing system until the coatings are hardened;
   s. winding the illuminated fiber on to the take up spool located al the bottom of the MOFDT; and
   t. continuing operation until the MOFDT control systems receive a command to stop operation.

2. The method claimed in claim 1, wherein a human operator generates the start and stop operations commands.

3. The method claimed in claim 1, wherein an external sensor such as a microgravity sensor or timer generates the start and stop operations commands.

4. The method claimed in claim 1, wherein the curing system is an ultra violet lamp.

5. The method claimed in claim 1, wherein the MOFDT container is capable of enclosing up to six integrated MOFDT assemblies.

6. A miniature optical fiber draw tower assembly for micro gravity environments, the draw tower assembly comprising:
   a. a container configured to house one or more bodies of a miniature optical fiber draw tower, the container configured to be purged with an inert gas or by vacuum;
   b. a draw tower body comprising a top and a bottom;
   c. an environmental dry box situated at the top of the draw tower, the dry box configured to create a low moisture environment;
   d. a preform holder removably housed within the dry box, the preform holder comprising a lid and configured to receive a preform with a lead wire and a spring-loaded pusher in such a way that the spring-loaded pusher presses downward on the preform when the lid is attached to the preform holder;

e. a furnace adjacent to the preform holder, the furnace configured to achieve high temperatures required to melt glass;
f. a laser-based diameter gauge configured to measure a diameter of an optical fiber;
g. a coating system configured to coal an optical fiber with an acrylic/polymer coating, the coating system comprising one or more enclosures through which an optical fiber passes and one or more pumps configured to spray the coating on to a fiber in a microgravity environment;
h. a curing system, the curing system configured to cure the acrylic/polymer coating on the optical fiber;
i. a spool motor assembly attached to the bottom of the draw tower body, the assembly comprising a spool and a motor, the motor configured to turn the spool at different rates, the spool configured to be removably attached to the lead wire and to hold a length of the lead wire and the optical fiber;
j. one or more tensioners/guides, each tensioner/guide configured to provide tension to the lead wire and control its position within the draw tower body; and
k. a control system, the control system configured to control and monitor the furnace, the laser-based diameter gauge, the coating system, the curing system, and the spool motor, the control system further configured to analyze data from the laser-based diameter gauge and speed up or slow down the spool motor based on the analysis, the control system further configured to accept commands from a remote location, a microgravity sensor or a timer.

7. The miniature optical fiber draw tower assembly for microgravity environments of claim 6, wherein the draw tower assembly comprises a de-spin mechanism housed within the container.

8. The miniature optical fiber draw tower assembly for microgravity environments of claim 6, wherein the container is capable of holding six integrated draw towers.

9. The miniature optical fiber draw tower assembly for microgravity environments of claim 6, wherein the curing system is an ultra violet lamp.

10. The miniature optical fiber draw tower assembly for microgravity environments of claim 6, wherein the furnace is housed inside the environmental dry box.

* * * * *